United States Patent

Williams et al.

Patent Number: 5,313,780
Date of Patent: May 24, 1994

[54] FREE-RIDING OIL TUBE DAMPER

[75] Inventors: Charles L. Williams, Milford; John G. Buechler, Mason; Tod W. Miller, Cincinnati; Steven J. Reilly, Fairfield, all of Ohio

[73] Assignee: General Electric Company, Cincinnati, Ohio

[21] Appl. No.: 986,216

[22] Filed: Dec. 7, 1992

[51] Int. Cl.$^5$ .............................. F02C 7/06
[52] U.S. Cl. .................. 60/39.08; 60/39.31; 184/6.11; 248/562; 248/636; 285/62
[58] Field of Search ............... 60/39.08, 39.31, 39.32, 60/39.33; 184/6.11; 248/65, 562, 597, 636; 285/61, 62

[56] References Cited

U.S. PATENT DOCUMENTS

| | | | |
|---|---|---|---|
| 3,793,838 | 2/1974 | Nash | 60/261 |
| 3,999,784 | 12/1976 | Kennedy, Jr. | 285/62 |
| 4,183,207 | 1/1980 | Libertini | 60/39.08 |
| 4,377,933 | 3/1983 | Lojou | 60/39.08 |
| 4,441,323 | 4/1984 | Colley | 60/39.32 |
| 4,534,535 | 8/1985 | Maeda et al. | 248/49 |
| 5,103,638 | 4/1992 | Roberts et al. | 60/261 |

FOREIGN PATENT DOCUMENTS 1001732 8/1965 United Kingdom .

Primary Examiner—Richard A. Bertsch
Assistant Examiner—W. J. Wicker
Attorney, Agent, or Firm—David L. Narciso; Jerome C. Squillaro

[57] ABSTRACT

A free-floating damper system is provided wherein a damper housing is configured to receive a damper arm for free-floating movement in the x/y plane while restricting similar movement in the z plane. The damper arm is specially configured with first and second wear bushings positioned in a spring biased support to insure the frictional generation of coulomb dampening forces between the damper arm bushings and the damper housing. The damper can be fixedly mounted to a portion of a gas turbine engine such as the turbine frame and a portion of the damper arm can be attached through a mounting bracket to an accessory tube of the engine to dissipate vibrational forces which otherwise can damage the accessory tube.

20 Claims, 3 Drawing Sheets

FREE-RIDING OIL TUBE DAMPER

The U.S. Government has rights in this invention pursuant to Contract No. F33657-88C-2133 awarded by the Department of the Air Force.

BACKGROUND OF THE INVENTION

The present invention relates to gas turbine engines such as turbojet and turbofan engines and more particularly to a damper for damping motion of an oil tube in a prespecified position relative to the engine. As will be appreciated by those skilled in the art, rigidly positioning an oil tube may cause stresses to be reacted in a weak link, such as an oil tube. Alternatively, mounting a tube without any dampening whatsoever causes the tube itself to experience all forces and becomes life cycle limited. Tube mounting locations must be chosen to provide adequate support yet allow for thermal growth between such relatively fixed locations.

The extremely harsh and stressful environment of a gas turbine engine imposes an additional difficulty in that severe and rapidly changing dynamic and temperature stresses are routinely developed and it is necessary that accessory tubes, such as oil tubes, must be able to exist in such a stressed environment. Additionally, it has been determined that a tube damper exposed to such an environment must be fabricated of a wear resistant material, such as metal, which can take the harsh, high temperature environment without deterioration and at the same time repetitively provide the requisite dampening. Such a tube damper needs to also be as lightweight as possible and be capable of mounting with a minimum of changes to the engine, using existing hardware, if possible.

SUMMARY OF THE INVENTION

It is therefore an object of the present invention to provide a gas turbine engine with an improved accessory oil tube damper for dampening movement of an accessory oil tube in the engine. It is another object of the invention to provide a damper which is wear resistant and tolerant of the high temperature and dynamically stressed environment of a gas turbine engine.

It is a further object of the invention to provide a gas turbine engine having a fairing mounted accessory oil tube damper which provides multi-axis coulomb dampening to dissipate applied stresses from motion of the accessory tube relative to the gas turbine engine.

Stated briefly, the present invention accomplishes the foregoing objects by incorporating in a turbofan engine a turbine frame accessory tube damper system including fluid carrying accessory tubes, such as an oil tube coupled between two points on an engine, mounting means coupled to said tube for coupling to a dampening means, and a free-riding, frictional damper means coupled to the mounting means.

In a preferred embodiment, the mounting means comprises a fluid coupling including an anti-rotation bracket wherein the free-riding frictional damper means can include a damper arm dynamically mounted within a damper housing. The damper arm can comprise a first arm in a first plane for mounting to said tube and also first and second rearward extensions comprising second and third arms respectively for bushing support in parallel planes transverse to the plane of said first arm. Second and third bushing support arms for bushings within the damper housing achieve free-riding coulomb or frictional damping by the bushings wearing on a damper housing in response to relative motion. The first arm can include a mounting finger coupled to a tube coupling including an antirotation bracket. The first arm can also include a stiffening member positioned between the finger and the bushing support arms. In a preferred embodiment, the plane of the bushing support arms are perpendicular to the plane of the mounting finger.

In the preferred embodiment, the damper housing comprises a three-sided bracket, comprising a first mounting plate and two substanially parallel sidewalls articulated therefrom. In a preferred embodiment, the sidewalls are substantially perpendicular to the mounting plate. The mounting plate preferably includes mounting hole for fixedly attaching the damper housing to the turbine frame and also include stability bumps for providing a stable base when the housing is mounted on a curved surface, such as a fairing. Additionally, either or both the first and second sidewall can include damper arm retention means, or stops, such as bent retention tabs. Preferably, the stops are positioned to prevent disengagement of the damper arm from the damper housing while allowing the damper arm a range of motion within the damper housing, thus not only allowing dampening motion but also ease of assembly of the housing the engine frame and the damper arm to the tube. The mounting plate prevents disengaging movement downward, and the stops prevent too much movement upward or afterward. The open mouth of the damper housing is intended for receiving the damper arm during assembly of the damper. In a preferred embodiment, one of the walls can be outfitted with a stop means for use after the damper arm has been installed, such as a hole for a rivet, for preventing the damper arm from retracting through the open mouth of the damper housing.

Further objects and variations of the present invention will become apparent from the following description of the preferred embodiments, taken in combination with the drawings in which FIG. 1 is a three-dimensional illustration of a turbine frame accessory tube damper system, including a free-riding frictional damper of the present invention;

DETAILED DESCRIPTION OF THE PREFERRED EMBODIMENT

Figure 1:
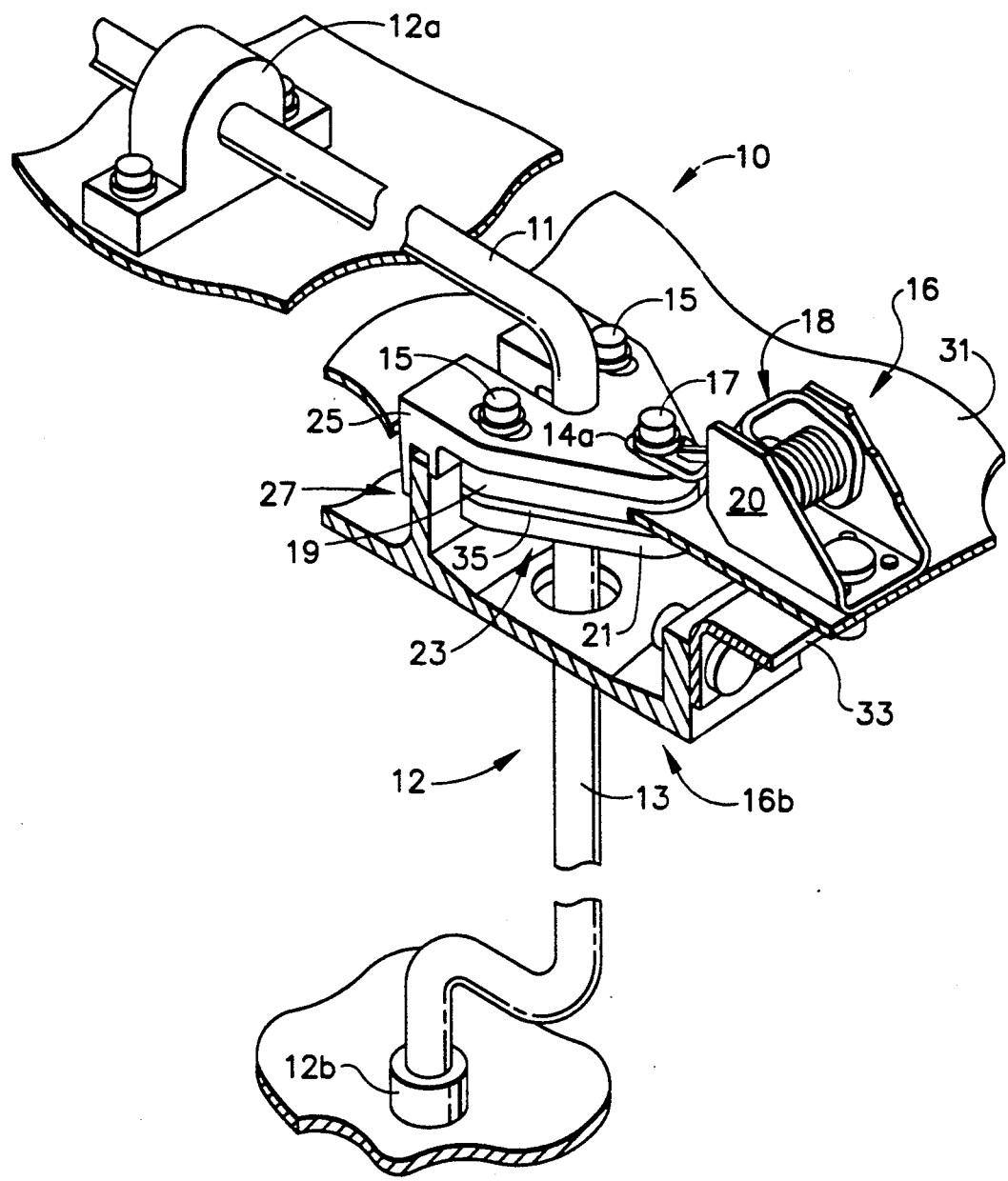

Referring now to FIG. 1, a turbine frame accessory tube damper assembly 10 is shown in three-dimensional illustration. The accessory tube 12 can, for instance, be a fluid-containing oil tube which is mounted between first and second engine frame connection points 12a and 12b. In a typical embodiment, the tube 12 can carry, for instance, lubricating oil to various parts in the engine. In a typical arrangement, a tube 12 is segmented and coupled at convenient assembly positions. In the embodiment depicted, a turbine frame oil supply tube includes a configuration tube 11 coupled to a frame strut tube 13 by, for instance, bolts 15 and 17 through an outer diameter flange 19 extending from the configuration tube 11, gasket 35, and an inner diameter flange 21 extending from the frame strut tube 13, referred to collectively as tube coupling 23. The tube coupling 23 can be outfitted with an anti-rotation bracket 25 fixedly attached by, for instance, welding or other rigid positioning means to the coupling 23 and adapted to engage a fixed engine member, as at 27, to prevent rotation of the tube 12 during assembly and disassembly of coupling 23. The damper 16 is coupled to the tube 12 at coupling 23 by bolt 17. The damper is rigidly mounted to a turbine frame shown in partial cross section as 16b. More particularly, the turbine structure can include a fairing 31 mounted on a fairing support bracket 33. The damper 16 preferable includes a damper arm 18 and a damper housing 20, the details of which are shown in exploded view of FIG. 2.

Figure 2:
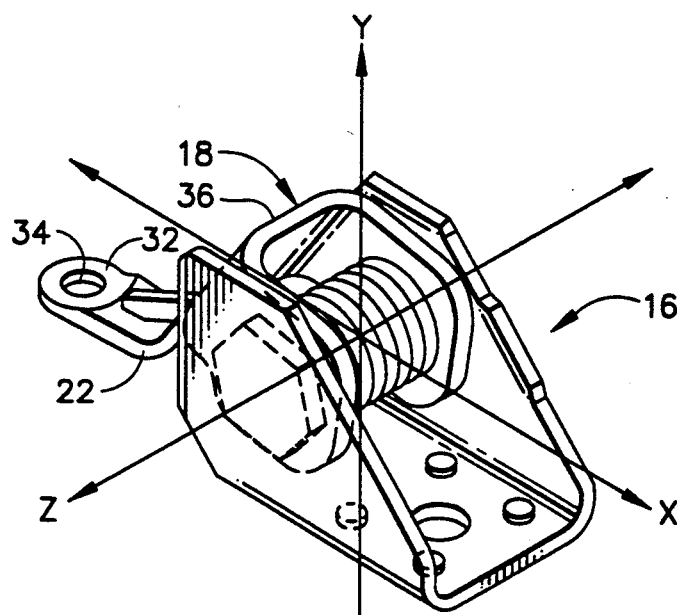
FIG. 2 is a three-dimensional illustration of the free-riding frictional damper of FIG. 1.
Figure 2A:
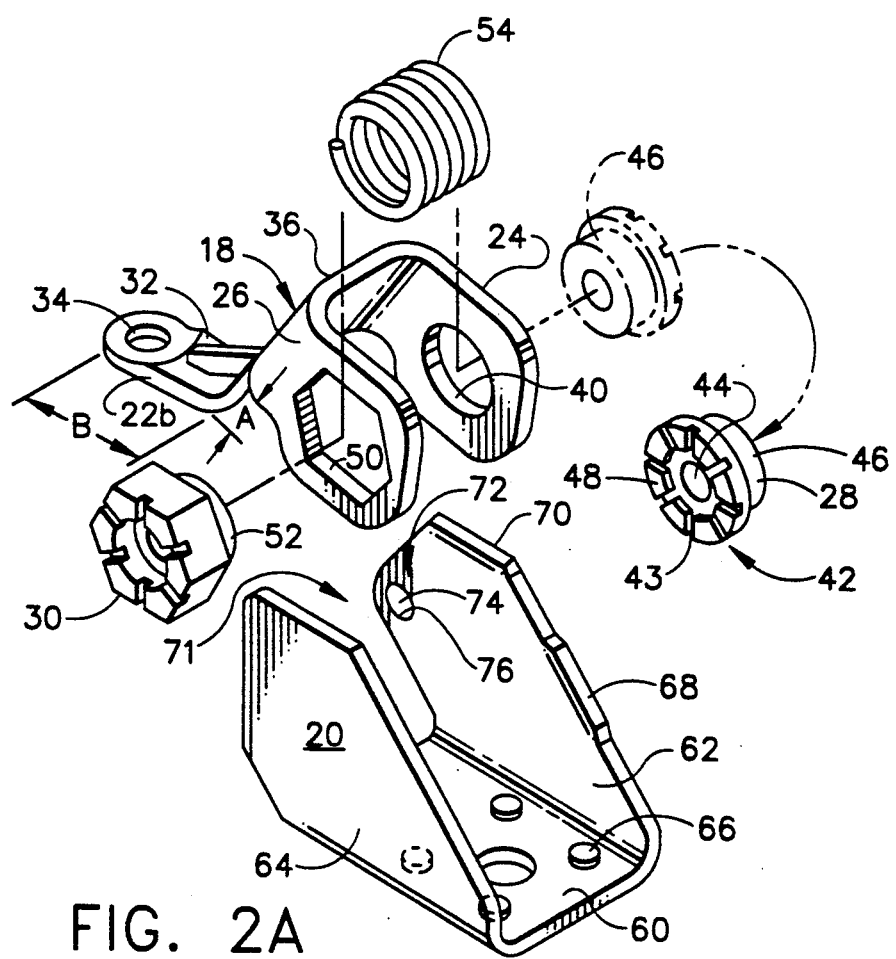
FIG. 2A is an illustration of an exploded view of the free-riding frictional damper of FIG. 2.

As shown in FIG. 2, the damper arm 18 includes a first arm 22 positioned in a first plane for mounting to said tube 12 at said coupling 23. The damper arm also includes second and third arms 24 and 26, respectively, located in planes transverse to the plane of said first arm for supporting first and second bushings 28 and 30, respectively, within the damper housing 20. The first arm 22 can include a mounting finger 32 located in said first plane having an alignment hole 34 located therethrough. In securing the damper 16 to the accessory tube 12, the alignment hole 34 of the damper arm is aligned with a similar hole 14a in the anti-rotation bracket 25 and coupling 23 and can be secured by an appropriate fastener, such as bolt 17. The first arm 22 is articulated from a damper arm central support 36. The first arm is curved or arched at a distance A from the central support and then extends in substantially planar manner for distance B to its extremity. In a preferred embodiment, the ratio from A to B is approximately ½. The curved or arched portion of the first arm, is operationally important to the device in that it facilitates movement of the arm within the damper housing to create frictional or coulomb dampening. Dampening is enhanced by all motion of the tube being translated to bushings 28 and 30; therefore, stiffness of the curved portion of the arm is maintained by a stiffener bracket extending between the upper portion of the first arm 22 proximate the central support 36 and the second portion 22b remote from the central support.

The damper arm 18 also includes second and third bushing support arms 24 and 26, respectively, which are disposed in second and third planes substantially parallel to each other. The second and third arms are angularly articulated from the central support such that the plane of the second and third arms is substantially perpendicular to the plane of the central support 36. The second and third arms 24 and 26 terminate in an enlarged ear portion which are adapted to receive first and second bushings 28 and 30. More particularly, the second damper arm 24 includes a central orifice or hole 40 for receiving the first bushing 28 therethrough. In a preferred embodiment, the first bushing 28 can comprise a disc-shaped bushing 42 having a central opening 44 therethrough and a cylindrical sleeve 46 mounted on the rear side thereof. In a preferred embodiment, for ease of manufacturing, the outside diameter of the cylindrical sleeve is slightly less than the inside diameter of the first hole 40. Further, the height of the cylindrical sleeve is substantially greater than the thickness of the second bushing arm such that when the cylindrical sleeve 46 is inserted within the first bushing hole 40, the cylindrical sleeve projects to the interior of the damper arm. In a preferred embodiment, the disc 42 can be welded to the outside surface 24a of the second arm so that all motion of the first arm results in motion to first bushing 28. Further, the outside wear surface or wear pad 48 of the disc 42 can include scores or grooves 43 to facilitate heat dissipation during free-riding movement of the bushing 28 within the damper housing 20 and self-cleaning of any debris from wear of the bushing and damper housing. Damper efficiency is enhanced by removing material from the radially inner portion of the wear surface, thus increasing the frictional radius as shown.

The third damper arm 26 includes a second opening or hole 50 for receiving a second bushing 30 therein. In a preferred embodiment, the bushing 30 comprises a hexagonal nut-shaped member, including a wear surface or wear pad 51 including cleaning grooves 53 similar to wear pad 48, having a central orifice therethrough. The hexagonally shaped opening 50 is only slightly larger than the second bushing 30, such that the bushing 30 can move along an axis of the second bushing opening 50 while translating substantially all planar motion of third arm 26, including rotation. The bushing further includes a second cylindrical sleeve 52 mounted to the rear side of the bushing 30 which is intended to project inwardly or toward the interior of the first and second bushing arms 22 and 24, respectively. As will be appreciated by those skilled in the art, once the bushings 28 and 30 are positioned within the bushing arms 24 and 26, respectively, the sleeves 46 and 52 are substantially axially aligned and project toward each other. In a preferred embodiment, a bushing bias means 54 such as a helical coil spring is positioned over the sleeves 46 and 52 between the first and second bushings for exerting an outwardly directed force on the first and second bushings 28 and 30, respectively. Thus, upon assembly, the second moveable bushing 28 is compressed against the helical spring 54 until it is approximately coplanar with the third damper arm 26 and the damper arm 18 is inserted within the damper housing 20. Accordingly, the spring 54 applies an equal and opposite force to the first and second bushings 28 and 30 and maintains these in frictional contact with the adjacent surfaces of the damper housing 20 described below. A helical compression spring with a low spring rate, such as about 85 lb. force/inch, makes designing a damper tolerant to dimensional stack-up and wear. Because a relatively large amount of deflection is required to achieve the design load, small changes in deflection due to stack-up or wear will account for only a small change in actual load.

The damper housing 20 is intended to provide a race within which the bushing faced damper arm 18 can travel. In a preferred embodiment, the damper housing 20 includes a base plate 60 and first and second substantially parallel sidewalls 62 and 64 respectively. In a preferred embodiment, the first and second sidewalls 62 and 64 are substantially perpendicular to the base plate 60. The base plate 60 can include a mounting alignment hole adapted for connection by a fastener means to a suitable portion of a gas turbine engine, such as the turbine support frame. In addition, the base plate 60 can include a plurality of stability bumps 66, such as rivets, adapted to establish a stable base when the base plate is installed on a curved surface.

Either the first or second sidewall can be outfitted with first and second stops 68 and 70, respectively. As will be appreciated by those skilled in the art, the base plate prevents the damper arm from traveling in a southernly direction. Similarly, the first stop 68 prevents the arm from traveling in a easternly direction and the second stop 70 prevents it from traveling in a northernly direction. Thus, the damper housing 20 has only an open face designated as 71 for receiving the damper arm and associated bushings therein. As illustrated, a retaining means 72 can be applied to either the first or second side 62 or 64 of the damper housing. In the illustrated embodiment, the retaining means 72 comprises a rivet 74 installed in hole 76 in second side 64. Thus, once the damper arm 18 and its associated bushings 28 and 30 are inserted within the damper housing 20, the retaining means 72 can be installed within the hole 76 to allow free-riding movement of the damper arm within the damper housing and in combination the retaining means 72 together with the base plate 60 and first and second stops 68 and 70 prevent the damper arm from inadvertently leaving the housing. Accordingly, the damper arm 18 is allowed to have free-riding motion within the damper housing 20 with the first and second bushings 28 and 30, respectively, providing frictional contact and coulomb dampening with the abutting interior surfaces of the first and second housing walls 62 and 64, respectively.

Figure 3:
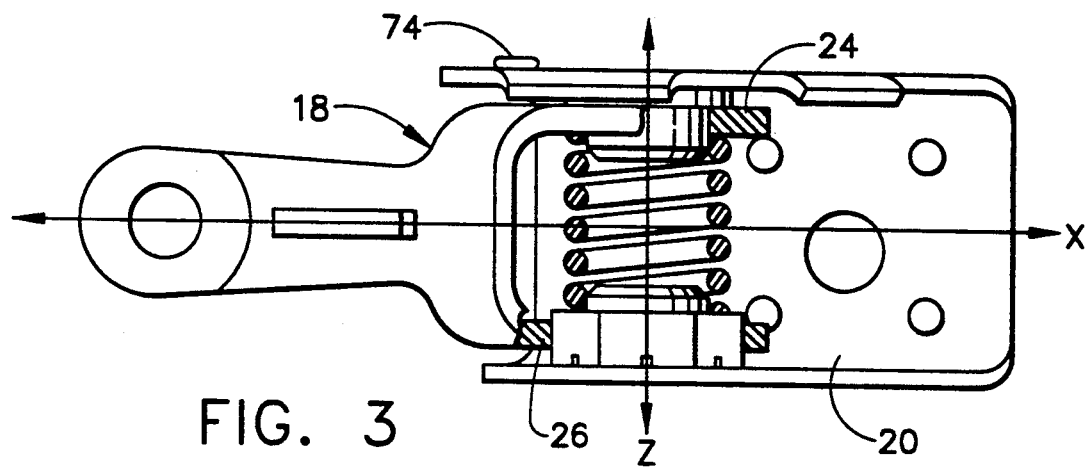
FIG. 3 is a top view of the FIG. 2 damper.

Referring now to FIG. 3, a top view of the assembled combination is shown wherein the damper arm 18 is inserted within the housing 20.

Figure 4:
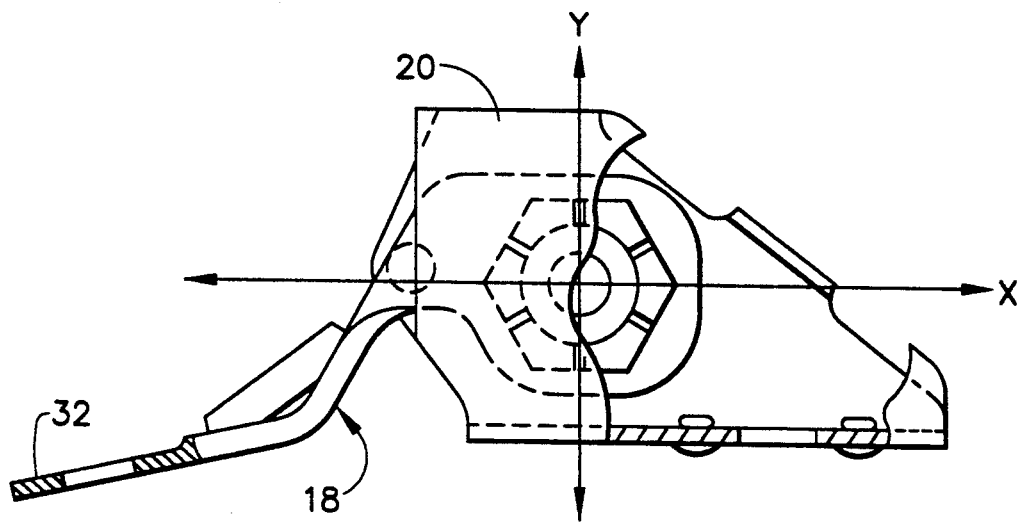
FIG. 4 is a partial cross-sectional illustration of the damper arm within the damper housing.
Figure 5:
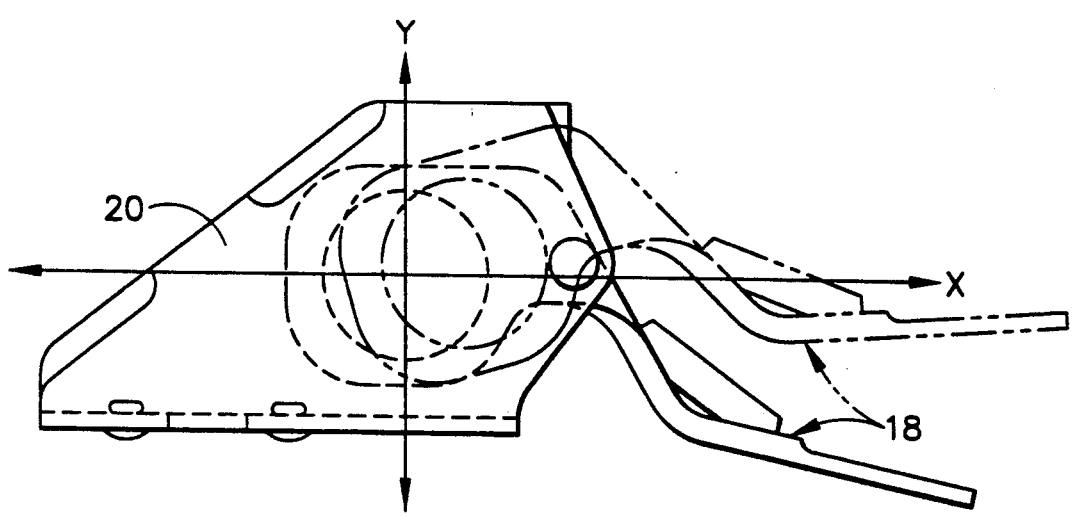
FIG. 5 is an illustration of movement of the damper arm within the damper housing from the opposite side of FIG. 4.

Referring now to FIG. 4, a side elevational view in partial cross section shows the damper arm 18 in a first position located within the damper housing 20. FIG. 5 illustrates two axis movement of the damper 18 within the damper housing 20 wherein the damper arm rotates about a central axis such that the first arm finger 32 moves in an upwardly direction and at the same time, the second and third arms 24 and 26, respectively, move from front to back within the damper housing.

In its inherent simplicity, the free-riding damper 16 provides a damper arm having two degrees of freedom allowing for translational and rotational movement in the x/y plane while being restricted from movement in the z plane. Accordingly, the damper system facilitates the generation of coulomb dampening forces to dissipate stress otherwise applied to the associated damping tube.

While the present invention has been described with reference to the preferred embodiment thereof, numerous variations may be made by those skilled in the art without departing from the essential spirit and scope of the invention. For example, the configurations of the first and second bushings 28 and 30 can be changed, as well as the helical spring 54 can be altered or substituted with other well known biasing devices. Similarly, the configuration of the damper housing and damper arms can be altered to fit the needs of a particular circumstance. Furthermore, the principles of the free-riding damper is not necessarily limited to the gas turbine turbofan engine environment, but also can be advantageously applied to other types of gas turbine engines. Other variations will occur to those skilled in the art which do not depart from the inventive concepts described herein.

We claim:

1. In a gas turbine engine, a turbine frame accessory tube damper system, comprising:
   a fluid carrying tube fixedly coupled between two points on said engine;
   mounting means coupled to said tube;
   a free-riding frictional damper coupled through said mounting means to said tube;
   wherein said free-riding damper comprises a damper arm dynamically mounted within a damper housing so as to allow relative motion between said damper arm and said damper housing.

2. The damper system of claim 1 wherein said damper housing further comprises stability bumps for providing a stable base when said damper housing is installed.

3. The damper system of claim 1 wherein said mounting means coupled to said tube comprises a tube coupling.

4. The damper system of claim 3 wherein said mounting means further comprises an anti-rotation bracket.

5. In a gas turbine engine, a turbine frame accessory tube damper system, comprising:
   a fluid carrying tube fixedly coupled between two points on said engine;
   mounting means coupled to said tube;
   a free-riding frictional damper coupled through said mounting means to said tube;
   wherein said free-riding damper comprises a damper arm dynamically mounted within a damper housing;
   further wherein said damper arm comprises a first arm in a first plane for mounting to said tube and second and third arms for bushing support in substantially parallel planes transverse to the plane of said first arm, for supporting first and second bushings respectively within said damper housing.

6. The damper system of claim 5 wherein said first, second and third arms extend in opposite directions from a damper arm central support.

7. The damper system of claim 6 wherein said first arm includes a first portion substantially coplanar with said damper arm central support and a second portion articulated at an angle with respect to said first portion wherein the length of said first portion is approximately one-half the length of said second portion.

8. The damper system of claim 7 further including a stiffening member positioned between said first and second portions of said first arm for stiffly maintaining the established angle between said first and second portions.

9. The system of claim 5 wherein said second and third damper arms include openings for receiving bushings therein.

10. The damper system of claim 9 wherein a first bushing is fixedly mounted to said second arm and includes a interiorally directed mounting post for receiving a biasing means.

11. The damper system of claim 9 wherein said third arm includes an opening for slidingly receiving a second bushing therethrough and to fix rotation of said bushing relative to said damper arm.

12. The damper system of claim 11 wherein said second bushing includes a mounting means for said biasing means.

13. The damper system of claim 12 wherein the biasing means comprises a helical compression spring.

14. The damper system of claim 12 wherein the opening in the third arm is a polygon.

15. The damper system of claim 12 further including a biasing means positioned between said second and third arms for applying outwardly directed pressure to said first and second bushings.

16. The damper system of claim 13 wherein the bushings include wear pads having cleaning grooves.

17. A tube damper for damping tube vibration in a tube fixedly mounted between two fixed locations in a gas turbine engine, said damper being mounted to a portion of a frame of the gas turbine engine, said damper comprising:
- a damper arm, including a mounting finger for attaching to the tube;
- a damper housing mounted to the engine frame;
- said damper arm having first and second rearward extensions for insertion within a damper housing;
- first and second wear bushings fitted to said first and second rearward extensions;
- bias means disposed between said rearward extensions and said associated bushings for applying axially opposite force to said bushings for developing frictional contact between said bushings and said damper housing for developing coulomb dampening forces between said damper arm and damper housing;
- said damper housing being configured for permitting free-floating motion of said damper arm within said damper housing.

18. The damper of claim 17 wherein said bias means includes a spring means positioned between said first and second bushings.

19. The damper of claim 17 wherein said first wear bushing is fixedly mounted to said first rearward extension and said second wear bushing has a polygonal exterior configuration and said second rearward extension includes a similarly polygonally-shaped opening for axially free-floating and rotationally fixed motion of said second bushing with respect to said opening within said second rearward extension.

20. The damper of claim 17 wherein said damper housing includes damper stops for retaining said damper arm.

* * * * *